United States Patent [19]
van den Boom et al.

[11] Patent Number: 4,723,121
[45] Date of Patent: Feb. 2, 1988

[54] ELECTRONIC LOCKING APPARATUS FOR MOTOR VEHICLES

[75] Inventors: Andreas van den Boom, Gelsenkirchen; Karl-Heinz Stellberger, Velbert, both of Fed. Rep. of Germany

[73] Assignee: Hülsbeck & Fürst GmbH & Co. KG., Velbert, Fed. Rep. of Germany

[21] Appl. No.: 905,678

[22] Filed: Sep. 9, 1986

[30] Foreign Application Priority Data

Sep. 10, 1985 [DE] Fed. Rep. of Germany ....... 3532156
May 14, 1986 [DE] Fed. Rep. of Germany ....... 3616197

[51] Int. Cl.[4] ........................ H04Q 9/04; E05B 49/00
[52] U.S. Cl. ............................ 340/825.310; 235/382; 361/171; 340/63
[58] Field of Search ...................... 340/825.31, 825.56, 340/64, 63; 361/171, 172; 235/382

[56] References Cited

U.S. PATENT DOCUMENTS

| | | | |
|---|---|---|---|
| 4,143,368 | 3/1979 | Route et al. | 340/63 |
| 4,213,118 | 7/1980 | Genest | 340/825.31 |
| 4,514,852 | 4/1985 | Hanni et al. | 455/38 |
| 4,596,985 | 6/1986 | Bongard et al. | 340/825.31 |
| 4,686,529 | 8/1987 | Kleefeldt | 340/825.31 |

FOREIGN PATENT DOCUMENTS

| | | |
|---|---|---|
| 0042886 | 1/1982 | European Pat. Off. . |
| 0098473 | 1/1984 | European Pat. Off. . |
| 2082804A | 3/1982 | United Kingdom . |

*Primary Examiner*—Donald J. Yusko
*Attorney, Agent, or Firm*—Peter K. Kontler

[57] ABSTRACT

A simple and economical, yet tamper-proof, electronic locking apparatus for motor vehicles features an electronic key and an electronic lock, which each contain a synchronized, constantly operating, precision oscillator. The output of each oscillator is applied at a predetermined counting rate to a respective number sequence generator. Both generators contain the same predetermined number sequence, which they step through at the same clock rate, applying the instantaneous value of the count to a first input of a respective computer. A second input of each computer is connected to a fixed memory which supplies a permanent, characteristic code number to the computer. Both the count state and the characteristic code number are combined using corresponding algorithms in the key and in the lock to produce a combination code. The key-produced combination code is sent from a transmitter in the key to a receiver in the lock and compared there with the lock-produced combination code. In the event of a successful comparison, a control pulse is generated, which actuates various positioning means in the lock.

12 Claims, 3 Drawing Figures

ELECTRONIC LOCKING APPARATUS FOR MOTOR VEHICLES

BACKGROUND OF THE INVENTION

The present invention relates to electronic locking devices in general, and more particularly to a system in which both a lock and a key contain computers which generate respective codes, and in which the codes must match to actuate the lock.

European Patent Publication EP-OS No. 0 098 437 discloses a locking apparatus in which the electric lock and key derive numbers from random number generators, which totally arbitrarily generate a host of numbers, which are processed according to a predetermined algorithm in a subsequent computer. The lock and key work as an interactive system with continously alternating transmitter and receiver, in order to transfer to each other the random numbers and the results of consecutive processing cycles. These are compared with each other, in alternation, one time in the lock, the next time in the key, until finally, after successful matching of all lock-produced and key-produced values, the lock generates a control impulse which actuates a positioning means in the vehicle. This locking apparatus is unusually tamper-resistant, to be sure, but also very expensive in terms of its components and operating program.

European Patent EP-PS No. 00 42 886 discloses a compact device which is not separable into an electronic key and a lock. The current state of a timing device is added to the constant secret number in a fixed memory, such as a Read-Only Memory (ROM) and the sum is fed to a comparison stage, but the mental activity of an attendant is necessary. The attendant or operator must add the known secret number to the timing value on a read-out, and punch in the sum on a keyboard. Calculation errors and keypunching errors are to be feared. With this device, intended for use as a combination lock for luggage, remote operation with a keyboard is not sensible, since the unencrypted transmitted combination code could be easily intercepted and deciphered by unauthorized persons.

U.S. Pat. No. 4,213,118 discloses a hotel locking system using key cards with two separate code fields which cooperate with a card-reader in the lock which has a code memory. A match with only one of the two code fields on the card is considered successful, and reprograms the lock for the new hotel guest. This results in reduced tamper-resistance. Oscillators and synchonization are not involved.

OBJECTS AND SUMMARY OF THE INVENTION

An object of the invention is to provide a locking apparatus which is resistant to tampering and other disturbances, yet economical to manufacture and compact in its construction. This is achieved using synchonization between key and lock.

Briefly, the key and the lock each contain a corresponding precision oscillator, preferably a quartz oscillator. The oscillators are synchronized and feed respective clock pulse or number sequence generators. The clock pulses are fed in turn to one of two inputs of a respective computer. The other input of each computer is connected to a fixed memory or ROM which stores a number which is distinctive of that lock-and-key pair. Both computers use corresponding algorithms to compute an encrypted combination code, which can be remotely transmitted from the key's transmitter to the lock's receiver. A re-try stage keeps trying if a match is not initially successful.

Timing inaccuracies among the two oscillators of an associated key-and-lock pair have the result that the associated clock pulse generators no longer have the same count state. The count state in the lock can be displaced one or more pulses before or after the count state in the key. The re-try stage deals with such deviations, in that it eventually carries out a successful match and then brings the respective count states back into congruence or agreement. The clock pulse generator in the lock is adjusted forward or backward to correspond. This tolerable deviation does not detract from the security of the system because the transmitted signal is composed of two quantities, of which neither is individually identifiable, and whose respective contributions to the combination code remain secret. Both quantities derive from the inaccessible interior of the key and lock. One quantity is the fixed value which is characteristic of the particular key-and-lock pair. By altering this fixed value, a great multitude of key-and-lock pairs, clearly distinguishable from one another, can be produced.

While the fixed value of the particular key-and-lock pair remains constant, the other quantity in the algorithm of the computer is predetermined, yet time-varying, since it results from the current count state output by the pulse generator each time the key is actuated. The count sequence has a sufficient range that the cyclically repeated count state repeats only after a long time, e.g. after a year. Observation of the transmitted signal therefore reveals only continually changing values. Quartz-controlled oscillators in the key and lock operate precisely and can be readily synchronized by use of the present invention.

The number sequence in the memory need not be increasing or decreasing in the arithmetic sense, but rather may be irregularly arranged internally. The number sequence need only be recorded in the key and lock in one-to-one correspondence. One could also construct the number sequence generator from a counter, which counted up or down stepwise in constant or varying steps. In that case, one could use the identical number sequence generator throughout all the key-and-lock pairs, since they are already sufficiently distinguished from one another by their algorithms and characteristic numbers.

The control pulses, to be produced by the motor vehicle locking apparatus of the present invention, generally actuate a positioning means according to a kind of flip-flop function. Thus, a first successful code comparison locks the door of the motor vehicle and a second, subsequent, successful code comparison unlocks the door. When the key is in place, various auxiliary functions can be actuated, e.g. adjustment of the rearview mirror, the built-in mirror, and the seat position. These adjustments can be customized to the respective key holder.

After a lengthy period of non-use, there can occur deviations between the count states in the sequence of the key and lock, which extend into a neighboring region of the sequence, in which the re-try element can still correct the deviation. This neighboring region will hereinafter be referred to for short as the "catch region". An overly broad catch region impairs the security of the lock, since an unauthorized person could intercept the signal and shortly thereafter re-transmit it, in order to illegitimately open the lock. For this region, a preferred feature of the invention is to reduce the extent of the catch region after each actuation of the lock. This takes into consideration that the disparities between the count states of lock and key develop only after a lengthy dormant period.

Another preferred feature is to adjust the size of the catch region differently for each key. Thus, one can widen the catch region proportionately, the longer the particular key has gone unused.

A particularly high degree of security is achieved by an additional preferred feature. If, after each actuation of the lock, one excludes from the catch region the recent numbers which resulted in actuation of the lock, signal interception by an unauthorized person at the instant of lock actuation by the correct key will be useless, since the catch region now excludes this count state and prevents it from being re-used.

The novel features which are considered as characteristic of the invention are set forth in particular in the appended claims. The improved electronic locking apparatus itself, however, both as to its construction and its mode of operation, together with additional features and advantages thereof, will be best understood upon persual of the following detailed description of certain specific embodiments, with reference to the accompanying drawings.

DESCRIPTION OF THE PREFERRED EMBODIMENTS

Figure 1:
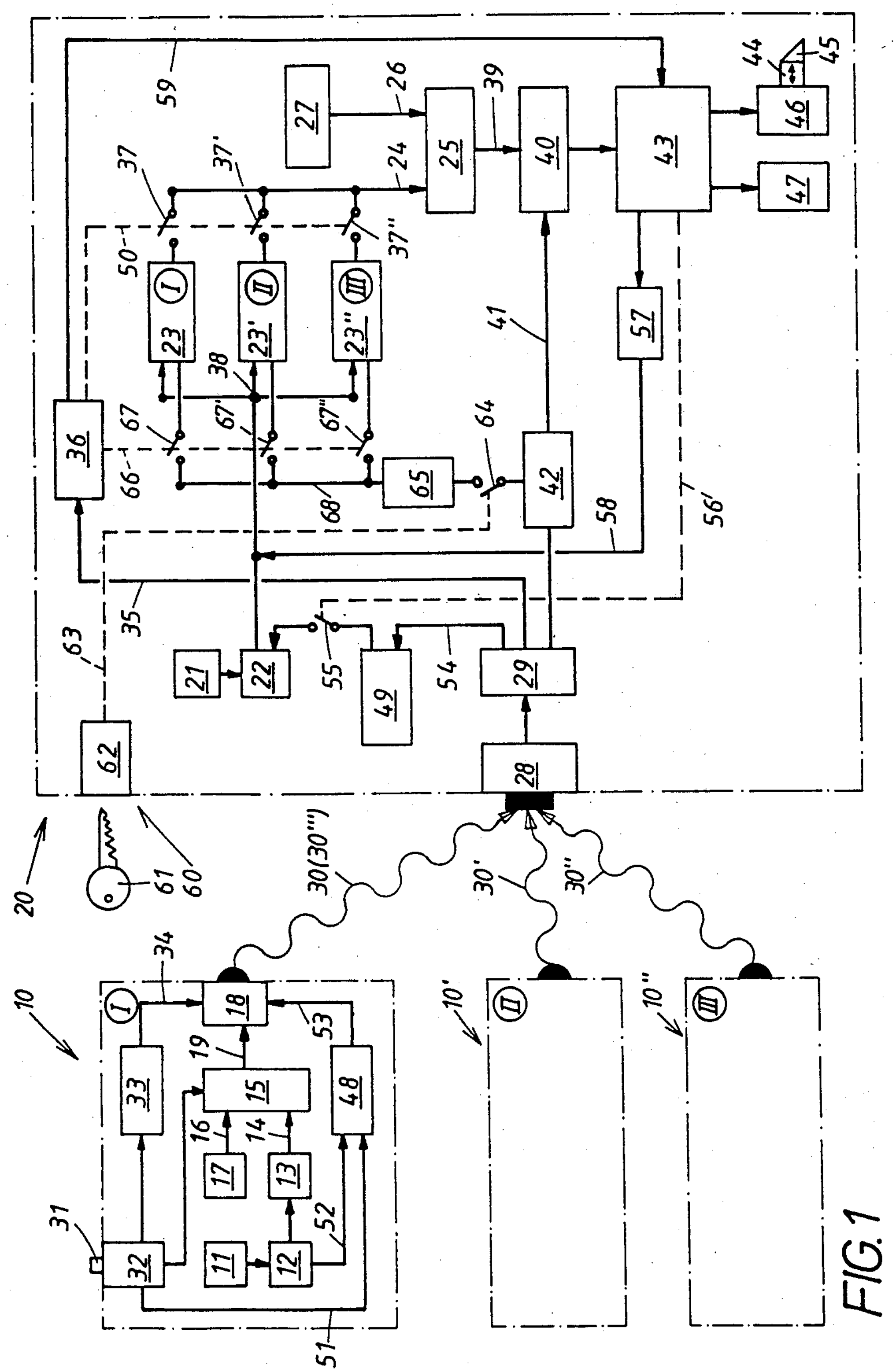
FIG. 1 is a block diagram of the major components of the electronic locking apparatus of the present invention.

As the respective dash-dotted frames in FIG. 1 show, the electronic locking apparatus of the present invention comprises a key-like part 10 and a lock-like part 20, which will hereinafter be referred to as "key" and "lock". In this locking apparatus, keys 10, 10', and 10", distinguishable from one another, nevertheless belong to the same lock. Since these keys have essentially identical constructions, only the first key 10 is illustrated in detail. The remaining keys 10', 10" contain substantially the same components.

Key 10 includes a high-precision timing oscillator 11, preferably quartz-controlled, which provides continuous inputs to a clock pulse generator 12, the output of the clock pulse generator in turn feeding a number sequence generator 13 which, at a predetermined timing interval of about 10 seconds, produces a counting signal. This number sequence generator 13 can comprise a memory in which a particular number string of great size is accomodated and decremented in steps. Alternatively, generator 13 can comprise a counter, which itself calculates the individual numbers and, by a sufficiently large bit-width, encompasses a large enough number range that stepping cyclically through the range will only result in repetition of a particular count state after a sufficiently long interval, e.g. a year. At any particular time specified by the clock pulse generator 12, generator 13 contains a specific, but constantly changing number, which is read out and which will be hereinafter referred to as the "count state".

Between two counting signals, which, for example, at 10 second intervals, clock pulse generator 12 produces a specific number of basic pulses, at, for example, one-second intervals. If desired, the counting signals and the basic pulses can be, respectively, the high-order bits or digits and the low-order bits or digits in a single counter. Thus, some bits can be used to represent a count or number in the sequence produced by the number sequence generator, while other bits can be used for synchonization. The current count state of the generator 13 is fed to a first input 14 of a computer 15 and there, in the simplest embodiment, directly used in an algorithm.

Computer 15 has a second input 16, connected to a memory 17, which, in the simplest embodiment, contains only a single fixed value. This fixed value serves to distinguish the particular key-and-lock pair 10, 20, or 10', 20, or 10", 20, and is therefore designated the "code number" of the pair. The constant code number 17, along with the time-varying count state 13, goes into the algorithm of computer 15, where they are, in a specific manner customizable for each locking apparatus, processed into an output signal, which is hereinafter designated the "combination code signal" because of its combination of the count state and the code number.

The output 19 of the computer 15 is connected to a transmitter 18 which transmits the output signal by electromagnetic, e.g. infra-red, radiation to the corresponding receiver 28 of the associated lock 20. Those skilled in the art will appreciate that the transmission of signal 30 can be carried out in any number of alternative ways, through any desired medium, e.g. direct electric contact, electromagnetically by radio, by electric arc, or by sound.

The key contains still further components. The production of the signal 30 is triggered by a button 31 on an actuator 32, which in turn is connected over three output lines to three respective components, one of which is computer 15, whose activity begins when button 31 is pressed. It is of course understood that oscillator 11, clock pulse generator 12, and number sequence generator 13 operate entirely independently of actuation of button 31, and thus continuously provide an ever-changing "count state" at computer input 14.

A further output line of actuator 32 is connected to a generator 33 of a further "initiationization" code. As shown by its output line 34 in FIG. 1, the initialization code is not subordinated to, or a function of, the algorithm of computer 15, but rather proceeds uncoded to the transmitter 18 and serves as an advance signal, designated in the drawing by reference numeral 30''', transmitted to the receiver 28 of lock 20. The initialization code, in the embodiment described below, comprises a string of three quantities, which are recognized in a decoder 29 connected to an output of receiver 28 in lock 20, and directed to additional lock components to be described below.

The initialization code from unit 33 comprises first, according to the invention, an identification code, which distinguishes the relevant key-and-lock pair 10,20, and provides the basis for additional electrical functions of the lock 20, but naturally does not itself actuate the control movements of the various positioning elements. The latter are not carried out until the comparison process, to be described below, in lock 20 has been successfully accomplished. This preparation of lock 20 justifies calling this portion of the initialization code the "identification" code.

A further quantity in the initialization code is a serial number of the relevant key 10 which unambiguously distinguishes it from the other keys 10', 10" associated with the same lock. For example, key 10 can have the serial number "I" as shown in FIG. 1. This code portion can therefore be called the "numerical code" of the respective key 10, 10', 10". From decoder 29, this signal travels over line 35 to a discriminator 36 in lock 20, which unambiguously determines which of the keys 10, 10', 10" is doing the actuating, and accordingly, as shown by the dashed control line 50 line in FIG. 1, connects the output of the respective lock's number sequence generator 23, 23', 23", corresponding one-to-one to that key, over a respective switch 37, 37', 37" to the lock's computer 25. As set forth above in the description of the key, the lock 20 has a frequency-identical oscillator 21 connected to its own clock pulse generator 22 synchronized to that of the key. The clock pulses are distributed through junction or node 38 to the respective number sequence generators 23, 23', 23" and consecutively step the count states therein. The correspondence of these lock-side number sequence generators 23, 23', 23" to the three keys 10, 10', 10" shown is assured by use of the same key serial numbers I, II, III.

As in the case of the key, lock 20 has a fixed memory 27, which stores the same "code number" as the key, and computer 25 has an analogous pair of inputs 24, 26 which receive the same quantities at the same time as the key, namely the time-dependent "count state" and the fixed "code number". Thus, there is produced at output 29 of computer 25 the same combination code signal as in the key, and this signal is fed to a comparison stage 40. A second input line 41 to element 40 comes from a memory 42, in which the combination code signal received from the key 10 through the receiver 29 is stored and provided to the comparison stage 40 for further evaluation.

The third portion of the aforementioned initialization code comprises a quantity which may be best designated as a "control" code, in which are contained specific, encoded control functions of lock 20 which are directed by the relevant key 10. These specific control functions of key 10 distinguish it from the control functions of the other keys 10', 10", which differ at least partially in kind or degree of adjustment. For one thing, these different control functions of the various keys 10, 10', 10" can produce a "key heirarchy" in the sense of a master key vs. an additional key. For example, the additional key of a motor vehicle could only unlock the door, while the master key could perform supplemental functions like unlocking the glove compartment or the truck.

A further possibility for differing control functions of the keys comprises a "memory" function for elevating comfort control in the motor vehicle by automatic adjustment of seat position or rearview mirror alignment to the individual requirements of the holders of the respective keys.

This control code portion of the uncoded or unencrypted initialization code does not immediately trigger, upon receipt of the uncoded advance signal 30'", the corresponding adjustments in the vehicle; rather, it informs, over line 59, a command execution stage 43, connected downstream of comparison stage 40, what specific control functions to undertake after successful matching of signals from key 10 and lock 20.

If the comparison stage 40 determines that identical signals are on its two inputs 39, 41, which presupposes that in both cases the same aforementioned "combination code" was provided, the control movements, previously specified by the aforementioned initialization code yet still reliably inhibited, are released and accomplish, as indicated in FIG. 1, a throw 44 of the bolt 45 of a door lock 46, and/or actuate another positioning means 47, which carries out another function, e.g. the aforementioned adjustment of the seat position.

It can happen that unavoidable differences, due to manufacturing tolerances, cause the key-side clock pulse generator 12 to deviate from the lock-side clock pulse generator 22. In that event, an automatic internal correction of the locking apparatus 10, 20 is desired. This is accomplished by a key-side synchronization stage 48 and a lock-side synchronization stage 49. The pressing of button 31 produces a signal over line 51 which actuates the key-side synchronization stage 48, which receives over line 52 the exact counting signal of clock pulse generator 12 and forwards it over line 53 to transmitter 18, which in turn transforms it into infra-red signal 30 and sends it to receiver 28 of lock 20.

For example, if one uses a 48-place binary number, whose last four places step in accordance with the basic pulses of clock pulse generator 12, but which do not affect the "count state" of number sequence generator 13, this information about the clock pulses, between the counting signals, can be used as a signal for interleaved synchronization.

This information is applied from the receiver 28 over line 54 to the corresponding lock-side synchronization stage 49, but not to the corresponding clock pulse generator 22 for co-ordination, so long as the intervening switch 55 between stage 49 and generator 22, as shown in the drawing, remains open. However, once a code comparison between respective combination code signals has been successfully accomplished, and the result applied to the command execution stage 43, the latter closes switch 55, as indicated by dashed line 56, thereby indicating to lock-side clock pulse generator 22 the exact time of the counting signal of the key. This synchronizes the clock pulse generator by a forward or backward adjustment corresponding to, and counteracting, the sensed deviation. Thus, after every successful interaction between key 10 and lock 20, command execution stage 43 carries out an immediate justification of the respective clock pulse generators 12, 22, which assures that the number sequence in the key-side generator 13 is precisely synchronized with the number sequence in the number sequence generators 23, 23', 23" provided in lock 20. The system is self-justifying.

The locking apparatus of the present invention thus operates successfully when the count states, in the respective number sequences of keys 10 and lock 20, deviate from each other by one or a few places. An unsuccessful comparison, which is communicated through the comparison stage 40 to the command execution stage 43, invokes the operation of a re-try stage 57, which acts over line 58 on the respectively connected lock-side number sequence generators 23, 23', 23". Starting with the unsuccessfully evaluated count state, re-try stage 57 causes the numbers immediately preceding and following that count state to be evaluated again in computer 25 and finally compared in element 40 with the received combination code signal stored in memory 42. If this comparison is successful, command execution stage 43 generates the corresponding control signal to positioning means 46, 47. Re-try stage 57 naturally limits the sampling of the number sequence, starting from the benchmark count state, to only one or two numbers in the preceding or following direction. This region encompassed by the re-try stage 57 is referred to as the "catch region" and will be explained in more detail below with reference to FIGS. 2 and 3. If comparison stage 40 determines that there is no match, command execution stage 43 remains blocked or inhibited and an alarm can be generated, which signals the unsuccessful attempt to force lock 20.

In a number of instances, e.g. upon starting operation of the locking apparatus 10, 20 of the present invention or upon replacement of the power supply in key 10 or lock 20, it is necessary to bring the respective count states of the number sequences into identity with each other. For this purpose, the invention features a particularly simple system, namely a supplemental mechanical locking system 60, with mechanical key 61 and mechanically matching key receiving element 62, which is a component of vehicle-side lock 20. The following takes place: After a successful run of the signal 30''' carrying the initializaion code, which confirms the relationship to lock 20 of the key 10 used, the lock-side memory 42 receives and stores the following combination code signal 30. If mechanical key 61 actuates its receiving element 62 within a specific, defined time afer receipt of the signals 30, 30''', element 62 sends a signal over a control line 63, shown dashed in FIG. 1, to close a switch 64 which actuates a decoder 65, which extracts from the combination code signal the current count state in key-side number sequence generator 13. Decoder 65 is pre-programmed with both the "code number" in fixed memory 27 and the individual numbers of the "number sequence". As previously described above, the initialization code signal 30''' is also applied to the discriminator 36, which then knows which of the available keys 10, 10', 10'' wishes to interact with lock 20, as was explained above in connection with control line 50 and its switches 37, 37', 37''. In the event of basic adjustment of the locking apparatus 10, 20 of the invention, using the aforementioned mechanical locking system 60, discriminator 36 actuates, over another control line 66, respective switches 67, 67', 67'' at the inputs of respective number sequence generators 23, 23', and 23'', in order to feed the result of the decoding in decode 65 over decoder output line 68 to the correct number sequence generator associated with the relevant key, and to reset that lock-side number sequence generator to agree with the key-side number sequence generator 13. Thus the relevant key 10 and the lock 20, with its associated generator, are precisely coordinated. The corresponding adjustment of the further number sequence generators 23', 23'' with the other remaining keys 10', 10'' must also be carried out.

If gate 20 has not been actuated with key 10 by code signal 30, 30''' for a long time, the cumulative effect of differing path delays in the respective oscillators 11, 21, or of similar errors, can lead to deviation between the count states of the respective number sequence generators. This can best be seen in FIG. 2, in which the time axis is labelled "t" and is divided into specific time intervals specified by the clock pulse generators 12, 22 of key 10 and lock 20, respectively.

At these intervals, numerical values $Z_x$ are produced from a large numerical range or sequence encompassed by the respective number sequence generators 13, 23. In the preferred embodiment, an ascending numerical sequence is used, which is generated by the following simple equation:

$$Z_x = N + x \cdot n$$

wherein $Z_x$ is a number in the numerical sequence, N is a specific starting number, n is the increment between two neighboring numbers, and x is the sequence number of the relevant value $Z_x$ in the aforementioned numerical sequence. For example, Z can be a six-place number, N can be 13, and n can have the value 27. It is clear that, instead of such an arithmetic progression, any desired discontinuous numerical sequence could be used. In the latter case, x would represent merely the sequence number of a particular value, rather than a factor in its calculation, as shown in FIGS. 2 and 3.

Figure 2:
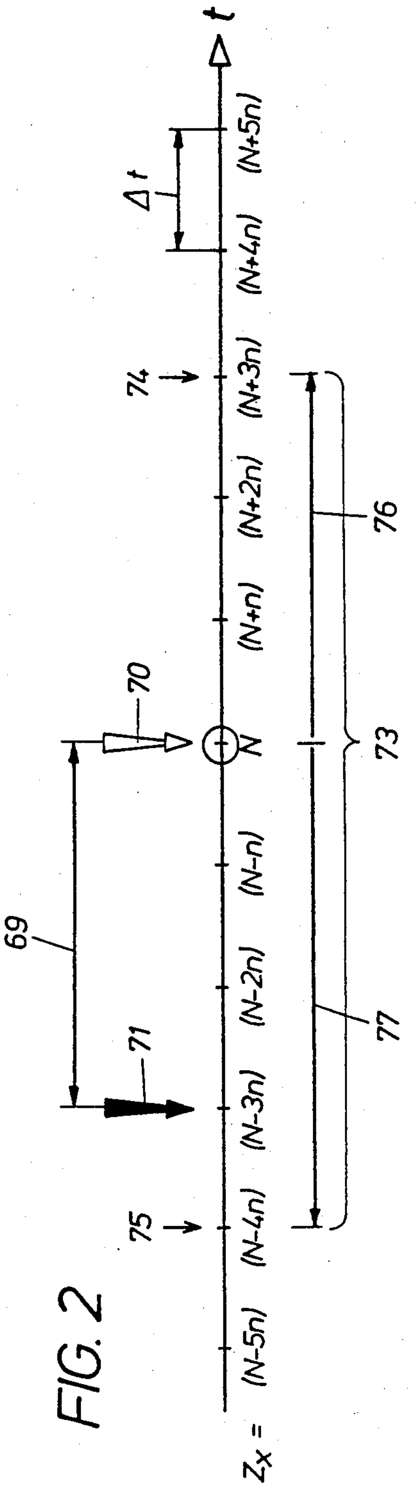
FIG. 2 is a timing diagram of the relationships which develop in a lock when it is not actuated for a long dormant period.
Figure 3:
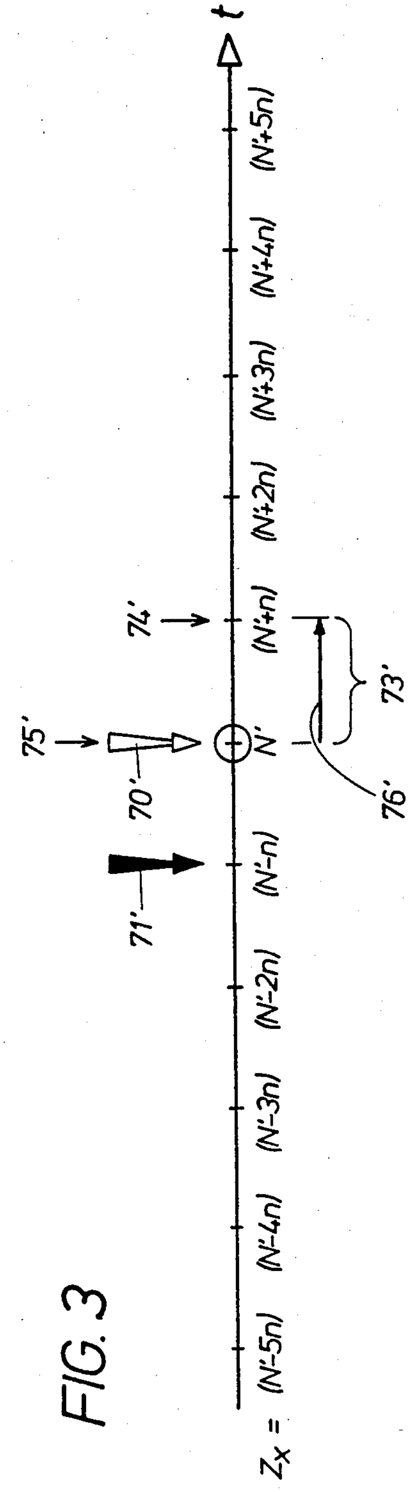
FIG. 3 shows the relationships of FIG. 2 immediately after actuation of the lock by the appropriate associated key.

FIG. 2, as previously mentioned, depicts the situation of the locking apparatus of the present invention at a particular point in time after the key 10 has not actuated the lock 20 for a long period, e.g. many weeks. At this instant, the count state in the number sequence generator 23 of lock 20 is indicated by the position of arrow 70. Generator 23, as previously described, applies to its computer 25 the number "N" of this number sequence. Assume that, at this instant, the count state of generator 13 in key 10 has become delayed and that, in the identical number sequence $Z_x$ produced in the key, generator 13 has reached only the position indicated by arrow 71. As shown in FIG. 2, there is a deviation of the count amounting to three number values of this number sequence $Z_x$, which corresponds to the time difference 69 shown in FIG. 2. Generator 23 of lock 20 finds itself at the number N position in its sequence, while generator 13 of key 10 is still only at the number N−3n.

In this situation, the next matching effort, in comparison stage 40, between the code signal 30 derived from key 10 and the code value obtained from lock-side computer 25, is bound to be fruitless. This invokes the re-try stage 57 in lock 20, which, starting from the current count state N in lock 20 obtains the neighboring numbers in the number sequence $Z_x$, namely the neighboring deviated values N±n; N±2n; etc.

The number values of a particular region 73 about the actual count state N in key 10 are encompassed. This region is, for a reason which will subsequently be apparent, designated "catch region 73". Since a deviation 69 between the respective count states 70, 71 can occur either upward or downward in the sequence, the catch region extends, as shown in FIG. 2, from the current count state N of lock 20, preferably equally in both directions, upward to a positive limit value 74 and downward to a negative limit value 75. Naturally, these limit values 74, 75 can be made asymmetric about current count state N if a particular tendency toward either acceleration or retardation of the count state 71 of key 10 is to be expected. From the current count state N, catch region extends a time period 76 into the future and a time period 77 into the past. Driven by re-try stage 57, computer 25 in the lock sequentially generates code values for the neighboring numbers in catch region 73 and feeds them for evaluation to comparison stage 40. When, in this example, the number (N−3n) is finally used in lock 20 for code calcuation, there will be agreement or identity with the code signal 30 from key 10, and comparison stage 40 in lock 20 operates successfully and carry out the associated lock motions 44 in the associated positioning means 46, 47. No number lying outside of catch region 73 will be permitted to be used in code number formation.

After key 10 has successfully cooperated with lock 20 in the above example of FIG. 2, the time difference 69 between the counts of key 10 and lock 20 can be easily resolved by adjusting the heretofore-pertaining count state 70 in lock 20 backward to the count state (N−3n), which is identical to that of key 10. Thus, the error is resolved. The subsequent count states 70, 71 in lock 20 and key 10 will thereafter be in precise agreement with each other.

The person using key 10 will have noticed nothing of this operating pattern of lock 20. Rather, lock 20 operates automatically in catch region 73 specified by re-try stage 57.

It could be that, in the aforementioned situation, an unauthorized person intercepted signal 30 of key 10 with the intention to use this signal illegitimately at a later time to force or electronically "jimmy" lock 20. This could indeed be successful, if the catch region remained at the same breadth and the forcing attempt was made within the past time period 77. Here another feature of the invention comes into play, namely that a successful actuation of lock 20 by key 10 alters the relationships of FIG. 2 into those shown in FIG. 3. The following details are illustrated:

FIG. 3 refers to the relationships at a point in time somewhat later than that of FIG. 2, and shows that the position 70′ in the number sequence $Z_x$ of the count state in lock 20 has changed, with respect to FIG. 2, to a differing and subsequent value N′. Re-try stage 57 in lock 20 is informed of the successful matching effort of comparison stage 40, and has reduced the catch region to minimal range 73′, shown in FIG. 3. It is noteworthy that minimal catch region 73′ is asymmetric with respect to current count value N′. There is merely a smaller time space extending into the future, while the time period extending into the past, represented in former catch region 73 as portion 77, has been completely eliminated. The upper limit 74′ of the catch region extends only one number forward, to the value (N′+n). The lower limit 75′ coincides with the current count 70′. The lower limit 75′ of this minimal catch region 73′ is in fact specified by the current count state N′ in number sequence generator 23 of lock 20, and this is why this important position is circled on the time axis.

This change of the catch region from that of FIG. 2 to that of FIG. 3 occurs immediately after effective actuation of the lock by key 10. The justification of the count state of lock 20 to that of key 10 has taken place, this count state having been successful, as was explained in connection with FIG. 2. By the time the relationships of FIG. 3 have been established, this count state lies in the past, at least to the extent indicated by the position of arrow 71″ in the number sequence $Z_x$. In any event, this state lies outside the now-obtaining minimal catch region 73′, and can therefore not be used by the unauthorized to force or "jimmy" the lock 20.

The relationships obtaining in FIG. 3, according to the locking apparatus of the present invention, change only upon passage of a lengthy dormant period, within which key 10 has not actuated lock 20. At this point, one has to anticipate that differential path or gate delays have arisen between generators 13 and 23, as a result of which the catch region should be correspondingly widened. Preferably, this also occurs step-wise, starting from minimal catch region 73′ and extending the catch region, as the dormant period lengthens, to numbers more and more displaced in the past and future from the current count state N′. Eventually, the catch region 73 of FIG. 2 again obtains. It is possible to provide outer limits 74, 75 beyond which the catch region should not widen, regardless of the increase in the dormant period.

The relationships shown are valid for only a particular key 10 and its lock 20. In those cases where multiple independent keys 10′ and 10″ are associated with the same lock 20, to tailor the relationships to the individual keys. These keys have, as previously described, a different initialization code, which is apparent from their transmission of their own signals 30′, 30″. Despite the common lock 20, the signals 30–30″ of the various keys 10–10″ are distinguishable from one another. This is especially true with respect to the respective count states in the number sequence generators of the respective keys, which makes it necessary to provide in the lock a separate number sequence generator 23, 23′, 23″ corresponding to each key.

Thus, it is possible in practice, for example, to have simultaneously the maximal catch region 73 shown in FIG. 2 for a seldom-used key 10″ and the minimal catch region 73′ shown in FIG. 3 for another key 10 due to its frequent use. By means of the initialization code, lock 20 knows which of the number sequence generators 23–23″ to use for evaluation purposes. Further, re-try stage 57 is informed, and provides the corresponding variously sized catch regions 73–73′.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should be, and are intended to be, comprehended within the meaning and range of equivalence of the appended claims.

We claim:

1. An electronic locking apparatus, particularly for motor vehicles, having
- an electrical lock;
- at least one positioning means connected to and actuated by the lock;
- at least one electrical key;
- means in each of said key and said lock for generating a code signal;
- means in the key for transmitting a code signal to the lock;
- means in said lock for comparing respective code signals generated by said key and by said lock; and
- means responsive to said comparing means for actuating said positioning means;

wherein
- a continuously operating oscillator (11,21) is provided in each of said key and said lock, said oscillators being synchronized with one another;
- a number sequence generator, connected to an output of said oscillator, is provided in each of said key and said lock;
- said number sequence generators cyclically stepping through identical predetermined sequences of numbers, in synchrony with one another;
- a computer, having at least one input, is provided in each of said key and said lock;

each number sequence generator has a time-varying count which is applied to said input of a respective computer;

a fixed memory, containing a code number characteristic of each key-and-lock pair, is provided in each of said key and said lock;

said fixed memory supplies said code number to a respective computer;

said computers contain identical algorithms and each use said algorithm to combine said time-varying count and said code number into a combination code, said combination code being transmitted as a signal between said key and said lock;

a re-try stage is provided in said lock which, upon failure to match respective codes derived from said key and said lock, selects numbers, in said predetermined sequence of numbers, lying above and below said count and directs the computer in said lock to sequentially produce further combination codes and attempt to match them with combination codes derived from said key;

upon successful matching of combination codes derived respectively from said key and said lock, one of said number sequence generators adjusts its count to agree with the count of the other of said number sequence generators.

2. The electronic locking apparatus of claim 1, wherein said key contains a memory which stores an initialization code, to be transmitted prior to said combination code, for initialization of said lock;

said initialization code contains at least information distinctive of said key-and-lock pair;

said initialization code contains information which specifies selective actuation of a particular number sequence generator within said lock;

said initialization code contains information which is distinctive of its particular key and specifies control movements supplemental to actuation of said lock;

a discriminator is provided in the lock, analyzes said initialization code, and responds thereto by directing selective actuation of other components of said lock.

3. The electronic locking apparatus of claim 1, wherein a synchronization stage is provided in said key and supplies clock pulse data which is transmitted, along with said combination code, to said lock; and a synchronization stage is provided in said lock and, upon successful matching of combination code signals derived respectively from said key and from said lock, detects any deviation between the respective counts of said number sequence generators and nulls said deviation by resetting the count of one of said generators to agree with that of the other generator.

4. The electronic locking apparatus of claim 1, wherein each number sequence generator comprises a multiposition counter whose contents are sent as a signal;

high-order positions in said counter represent said counts in said sequence of numbers;

low-order positions in said counter represent clock pulse data to be used for synchronization of said said key and lock;

and upon actuation of said key, said counts and said clock pulse data are transmitted, alternately, to said lock.

5. The electronic locking apparatus of claim 1, wherein for complete re-synchronization of said lock, a mechanical key and a mechanical key receiving element, connected to components of said lock, are provided;

a decoder is provided in said lock for deriving from the signal received from said electrical key the count in the number sequence generator of said electrical key; and upon actuation of said key receiving element by said mechanical key, said decoder is connected to receive said signal from said electrical key and to inputs of each number sequence generator in said lock to reset the count in each generator to agree with the count in the generator in said electrical key.

6. The electronic locking apparatus of claim 1, wherein each of said oscillators is a quartz oscillator.

7. The electronic locking apparatus of claim 1, wherein the extent of the catch region of the re-try stage is reduced upon every successful matching of codes derived respectively from said key and from said lock, and the extent of said catch region is increased after a predetermined dormant period in which no actuation of the lock by the key occurs.

8. The electronic locking apparatus of claim 7, wherein a plurality of keys coded to actuate said lock are provided, and adjustment of the extent of said catch region is carried out separately for each of said keys.

9. The electronic locking apparatus of claim 7, wherein the extent of said catch region is increased, with respect to the current count state (N), up to predetermined upper and lower limits, according to increasing duration of said dormant period.

10. The electronic locking apparatus of claim 1, wherein a minimal catch region is invoked for a predetermined period immediately after every successful matching of codes derived respectively from said key and from said lock, said minimal catch region extending, with respect to the current count state (N), only toward future, not-yet-reached, numbers in said sequence of numbers, and excluding past, already-reached, numbers in said sequence, thereby excluding from the catch region the count state used in making said successful match and rendering unavailing re-use of said count state.

11. An electronic locking apparatus, particularly for motor vehicles, having an electrical lock; at least one positioning means connected to and actuated by the lock; at least one electrical key; means in each of said key and said lock for generating a code signal; means in the key for transmitting a code signal to the lock; means in said lock for comparing and matching respective code signals generated by said key and by said lock; and means responsive to said comparing and matching means for actuating said positioning means, wherein a continuously operating oscillator is provided in each of said key and said lock, a number sequence generator, connected to an output of said oscillator, is provided in each of said key and said lock, said number sequence generators cyclically stepping through identical predetermined sequences of numbers, in synchrony with one another, a computer, having at least one input, is provided in each of said key and said lock, and a re-try stage is provided in said lock which, upon failure to match respective codes derived from said key and said lock, selects numbers, in said predetermined sequence of numbers, lying above and below said count and directs the computer in said lock to sequentially produce further combination codes and attempt to match them with combination codes derived from said key.

12. An electronic locking apparatus, particularly for motor vehicles, having an electrical lock; at least one positioning means connected to and actuated by the lock; at least one electrical key; means in each of said key and said lock for generating a code signal; means in the key for transmitting a code signal to the lock; means in said lock for comparing and matching respective code signals generated by said key and by said lock; and means responsive to said comparing and matching means for actuating said positioning means, wherein a continuously operating oscillator is provided in each of said key and said lock, a number sequence generator, connected to an output of said oscillator is provided in each of said key and said lock, said oscillators being synchronized with another, and for complete re-synchronization of said lock, a mechanical key and a mechanical key receiving element, connected to components of said lock, are provided, a decoder is provided in said lock for deriving from the signal received from said electrical key the count in the number sequence generator of said electrical key and, upon actuation of said key receiving element by said mechanical key, said decoder is connected to receive said signal from said electrical key and to inputs of each number sequence generator in said lock to reset the count in each generator to agree with the count in the generator in said electrical key.

* * * * *